(12) United States Patent
Darby

(10) Patent No.: US 8,459,511 B2
(45) Date of Patent: Jun. 11, 2013

(54) VALVE

(75) Inventor: Ian Darby, Rugby (GB)

(73) Assignee: DS Smith Plastics Limited, Maidenhead (GB)

(*) Notice: Subject to any disclaimer, the term of this patent is extended or adjusted under 35 U.S.C. 154(b) by 156 days.

(21) Appl. No.: 13/125,278

(22) PCT Filed: Oct. 23, 2009

(86) PCT No.: PCT/GB2009/002533
§ 371 (c)(1),
(2), (4) Date: Jun. 30, 2011

(87) PCT Pub. No.: WO2010/046660
PCT Pub. Date: Apr. 29, 2010

(65) Prior Publication Data
US 2011/0248054 A1    Oct. 13, 2011

(30) Foreign Application Priority Data
Oct. 24, 2008 (GB) .................................. 0819501.8

(51) Int. Cl.
*B67D 3/00* (2006.01)
*B67D 7/06* (2010.01)
*F16L 29/00* (2006.01)
*F16L 37/28* (2006.01)

(52) U.S. Cl.
USPC ...... 222/522; 251/149.2; 251/149; 251/149.1

(58) Field of Classification Search
USPC ................. 222/522, 523, 525, 507, 501, 505,
222/499; 285/305, 307, 314, 320, 239; 141/291,
141/292, 347, 348, 349, 354, 368, 383, 387;
251/148, 149, 149.1, 149.2, 155, 339, 349,
251/351, 149.7, 149.9; 604/905
See application file for complete search history.

(56) References Cited

U.S. PATENT DOCUMENTS

| | | | | |
|---|---|---|---|---|
| 2,874,981 | A * | 2/1959 | Brady | 285/238 |
| 4,007,909 | A * | 2/1977 | Buseth et al. | 251/149.2 |
| 4,586,694 | A * | 5/1986 | Jones | 251/149.2 |
| 5,769,107 | A * | 6/1998 | Woodruff | 137/1 |
| 6,086,044 | A * | 7/2000 | Guest | 251/149.9 |
| 6,641,177 | B1 * | 11/2003 | Pinciaro | 285/242 |
| 7,942,861 | B2 * | 5/2011 | Stanus et al. | 604/414 |
| 8,167,339 | B2 * | 5/2012 | Yagisawa et al. | 285/305 |
| 2006/0192164 | A1 * | 8/2006 | Korogi et al. | 251/149 |
| 2007/0138423 | A1 | 6/2007 | Smith | |

* cited by examiner

*Primary Examiner* — Kevin P Shaver
*Assistant Examiner* — Benjamin R Shaw
(74) *Attorney, Agent, or Firm* — Joseph A. Fuchs; The Chicago Technology Law Group, LLC

(57) ABSTRACT

A valve (100) comprising a tubular body (110) closed at a proximal end (111) and open at a distal end (112), outer sealing surfaces (120, 130) provided at the proximal and distal ends for sealing against an inner surface of a tube, the body comprising a flexibly mounted leg (150) between the proximal and distal ends, the leg configured to flex outwards from the body on engagement of the open distal end with a spigot so as to open a fluid flow path through the body.

15 Claims, 6 Drawing Sheets

VALVE

This application is a 35 U.S.C. §371 U.S. National Stage filing of PCT/GB2009/002533, filed Oct. 23, 2009, which claims priority to Application Number GB 0819501.8, filed Oct. 24, 2008, both of which are incorporated in their entirety herein by reference and made a part thereof.

The invention relates to valves for use in dispensing or venting fluids.

In the catering industry, liquids such as fruit juices and other still soft drinks are often supplied in packs with disposable dispensing valves. This allows for easy attachment to standard dispensing apparatus, and reduces the possibility of leakage and spoilage. Such valves may be designed to automatically open when attached to a dispensing apparatus, and possibly to automatically close when removed from the dispensing apparatus. This allows for packs to be used over an extended period of time without air being entrained into the pack, which could lead to spoilage of the contents.

One problem with existing valves is that, to allow for automatic opening and resealing, a valve will typically need to be constructed from several components including a spring or other resilient component to allow the valve to automatically reseal when removed from a dispensing apparatus. Otherwise, it may be necessary to completely empty the contents of a pack before removing it from the dispensing apparatus, or the pack may need to be thrown away before being emptied if another different pack is temporarily required. Not having an automatically resealing valve therefore reduces the flexibility of being able to use a dispensing apparatus with more than one type of liquid, as well as a higher risk of spillage when being attached and removed. Conventional resealable valves, however, having multiple components, adding to the cost and complexity of the liquid container as a whole.

It is an object of the invention to address the above problem.

In accordance with a first aspect of the invention there is provided a valve comprising a tubular body closed at a proximal end and open at a distal end, outer sealing surfaces provided at the proximal and distal ends for sealing against an inner surface of a tube, the body comprising a flexibly mounted leg between the proximal and distal ends, the leg configured to flex outwards from the body on engagement of the open distal end with a spigot so as to open a fluid flow path through the body.

An advantage of the invention is that a resealable connection is provided in the valve using the tube itself, rather than through use of additional components. This simplifies construction and reduces the cost of the valve.

The leg may comprise an inner cam surface configured to engage with an outer surface of the spigot to cause the leg to flex outwards. The cam surface allows the valve to be designed so as to allow a required flow rate through the valve when engaged, with a higher profile cam allowing for an increased flow rate.

The leg may be connected to the body section by a flexible hinge. Such a flexible hinge may be formed by providing a thinned section where the leg connects to the body section. The leg may alternatively be made flexible along its length, depending on the design of the valve.

The body section of the valve is preferably substantially cylindrical between the proximal and distal sealing surfaces, so as to allow the valve to properly seal against an inner surface of a tube into which it is inserted. Shapes other than cylindrical, for example tapered or waisted, may alternatively be used.

The valve preferably comprises a pair of said legs configured to extend outwards away from the outer surface in opposing directions on engagement of the body section around a spigot, thereby providing a symmetrical construction and a greater fluid flow through the valve when engaged with a spigot.

The valve optionally comprises a flange extending from the distal end of the cylindrical body section, which serves to provide purchase against which to push the valve on to a spigot, and allows a user to see that the valve is fully engaged.

The valve may comprise a tapered section at the proximal end, which allows for an easier insertion into the tube. The proximal end may comprise a cutaway portion defining a flow channel around the proximal end, which improves fluid flow through the valve.

The valve is preferably of unitary construction, i.e. is made of a single piece for example by injection moulding. This greatly simplifies manufacturing as no assembly is required before attachment.

According to a second aspect of the invention there is provided a liquid dispensing apparatus comprising:
  a container for holding liquid therein;
  a dispenser tube extending from the container; and
  a valve according to the invention of the first aspect disposed within a free end of the tube, the sealing surfaces at the proximal and distal ends of the tube valve being sealed against an inner surface of the tube.

According to a third aspect of the invention there is provided a method of operating a liquid dispensing apparatus according to the invention of the second aspect, the method comprising:
  inserting a spigot into the open distal end of the valve to cause the flexibly mounted leg to flex outwards away from the outer surface of the tube valve, breaking a seal at the proximal end of the valve between the sealing surfaces and the inner surface of the tube and thereby opening a flow path in the valve to allow liquid to pass through the tube and the spigot.

The invention will now be described by way of example, and with reference to the enclosed drawings in which:

FIG. 1b is an alternative perspective view of the tube valve of FIG. 1a;

Figure 1A:
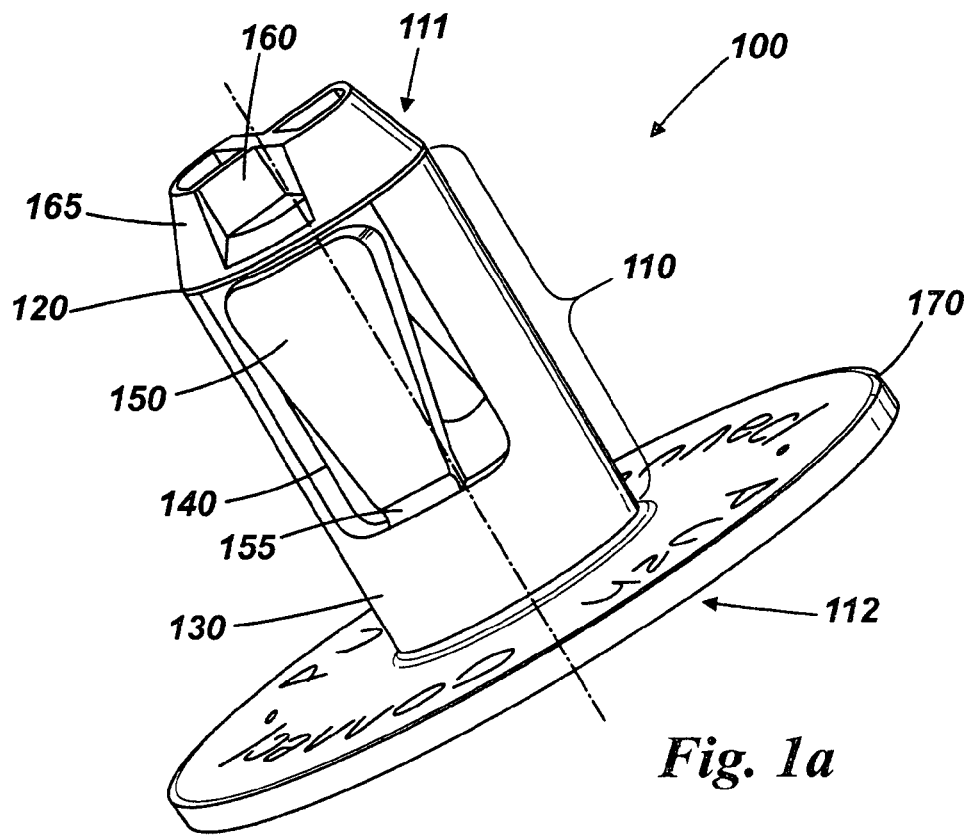
FIG. 1a is a perspective view of a tube valve according to the invention.
Figure 1B:
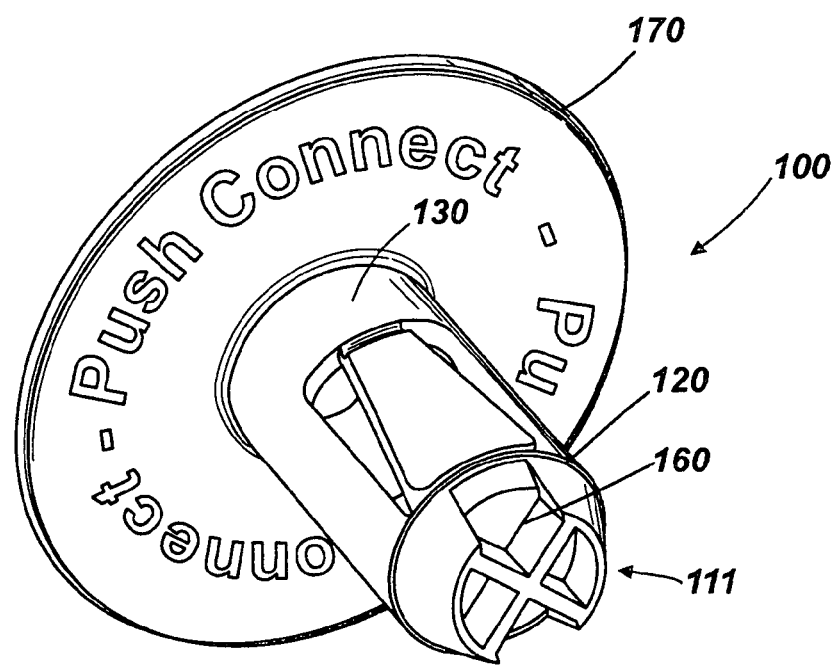

Shown in FIGS. 1a and 1b are two perspective views of an exemplary embodiment of a valve 100 according to the invention. The valve 100 comprises a tubular body portion 110 having a proximal end 111 and a distal end 112, relative to a tube into which the valve 100 can be inserted. Sealing surfaces 120, 130 are provided around the outer surface of the body section 110 at the proximal end 111 and the distal end 112 respectively, for sealing against an inner surface of the tube into which the valve 100 is inserted, as shown below with reference to the subsequent figures.

The body portion 110 comprises a cut-out section 140 between the sealing surfaces 120, 130 within which is provided a flexibly mounted leg 150. In the embodiment shown, the leg 150 is hinged with respect to the body portion 110 so that the leg is configured to flex outwards and away from the body section when a spigot is inserted into the valve 100 at the open distal end 112, as detailed below with reference to subsequent figures. The leg 150 may be designed to cover a portion or the whole of the cut-out section. In the embodiment shown, the leg 150

A tapered section 165 is provided at the proximal end 111 of the valve body portion 110 to allow for easier insertion of the valve 100 into a tube. A cutaway portion 160 defining a flow channel around the proximal end is provided to ease the flow of liquid around the proximal end when the valve is opened.

Figure 2:
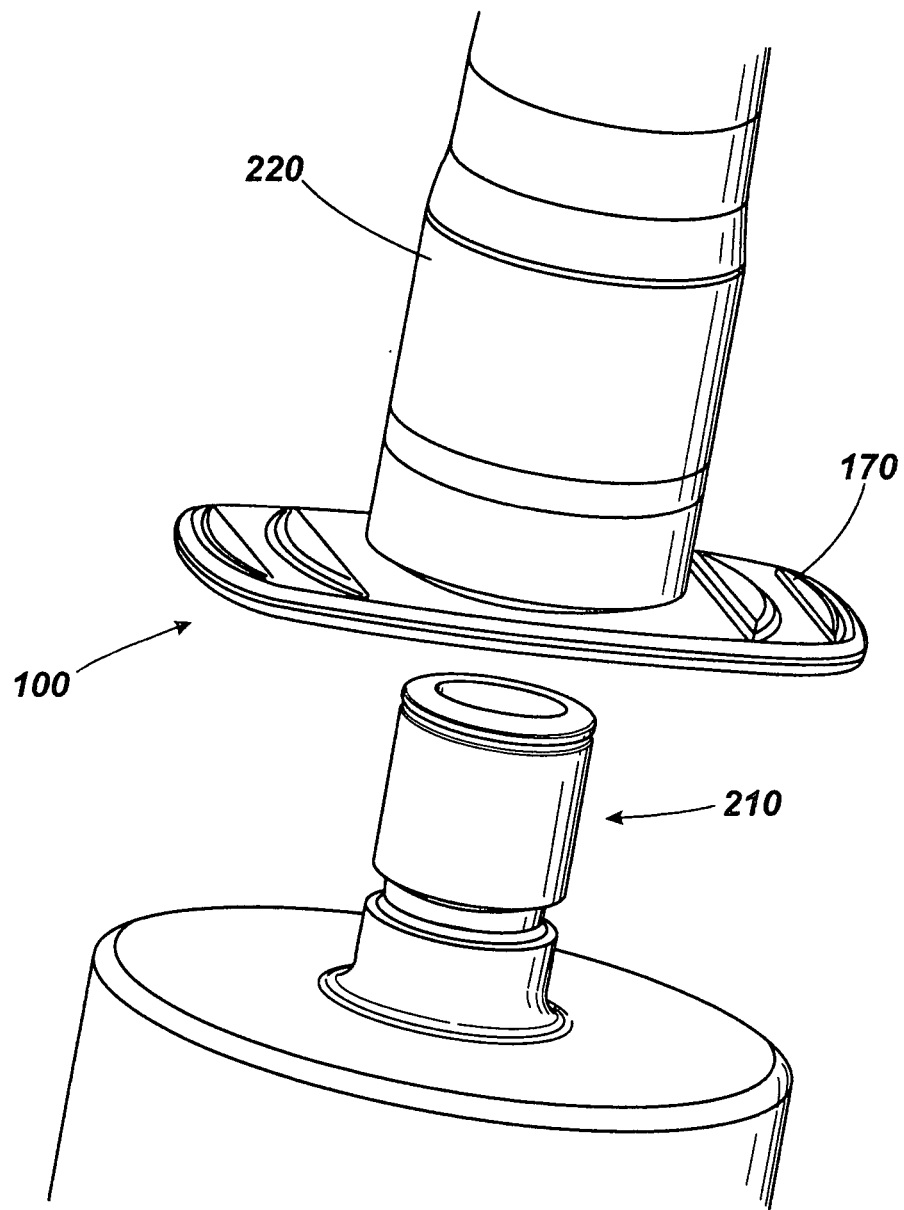
FIG. 2 is a perspective view of a tube valve attached to the end of a tube, prior to engagement with a spigot.

An optional flanged portion 170 is shown in the valve 100 of FIGS. 1a and 1b, which allows for extra purchase for the valve to be attached to a spigot and provides an end stop to prevent the valve 100 from being inserted too far into a tube. The flange may be of a shape other than circular, as shown in FIGS. 1a and 1b. In FIG. 2, the flange 170 is of a more rectangular shape, but serves the same purpose. In FIG. 2, the valve 100 is shown inserted in the end of a tube 220. The tube is shown distended around the portion where the valve 100 has been inserted. Tubes for use with the valve according to the invention are preferably composed of an elastomeric material, for example a silicone or other type of rubber. This is to allow the tube to perform the required function of providing a liquid seal with the valve when in use.

In FIG. 2, the valve 100 is shown prior to engagement with a spigot 210 of a dispensing apparatus. The valve 100 and tube 220 to which the valve is attached may, for example, be attached to a liquid container of the bag-in-box type, i.e. where an air inlet port is not required since the bag collapses within the box as liquid is removed. This type of container thereby allows for removal and reattachment without the liquid being spoiled through oxidation. It is important, however, that a proper seal is created that prevents air ingress when the valve is removed from the dispenser. In the valve according to the invention, this seal is created automatically when the valve is removed from the spigot, as well as the seal being broken automatically when the valve is attached to the spigot.

Figure 3:
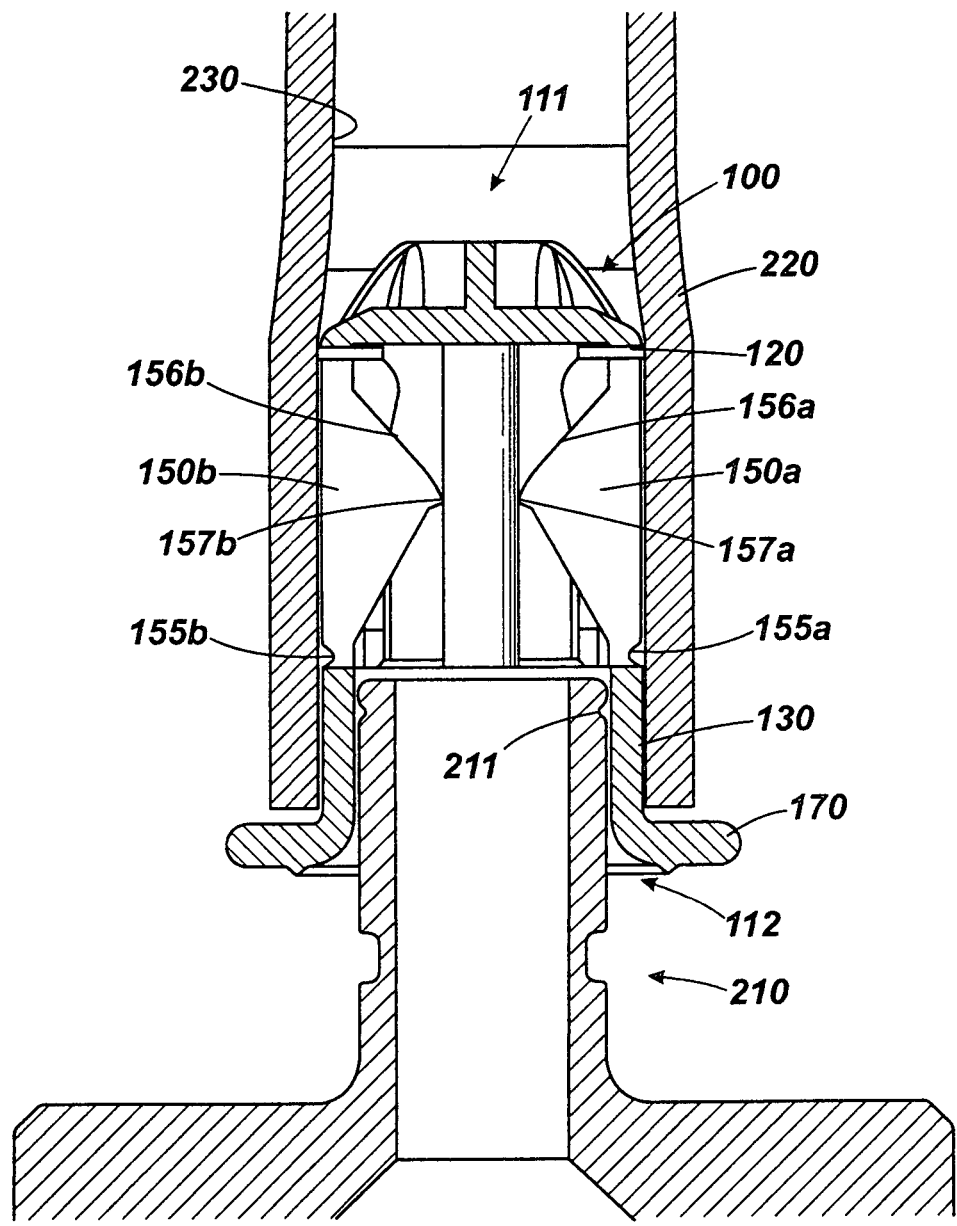
FIG. 3 is a cross-sectional view through a tube valve, tube and spigot in a first engagement configuration.

FIG. 3 shows a cross-sectional view of the valve 100 in place within a tube 220, with the spigot 210 of the dispensing apparatus being partially inserted through the distal end 112 of the valve 100. In the embodiment shown, the valve comprises two opposing flexibly mounted legs 150a, 150b within the body portion 110, the legs 150a, 150b being mounted to the body portion by flexible hinges 155a, 155b at the root of each leg. The flexible hinges 155a, 155b may be simply provided by a thinner wall section at the root of each leg. Alternatively, the legs 150a, 150b may be flexible along a greater portion of their length, depending on the resilience and resistance to flexing required.

Each leg 150a, 150b comprises a cam surface 156a, 156b extending into the tubular body portion of the valve. The cam surfaces 156a, 156b are configured to engage with the outer surface of the spigot 210 so as to force the legs outwards and away from the body portion 110 when the spigot 210 is inserted fully into the valve 100. Further engagement features 157a, 157b may be provided on the cam surfaces 156a, 156b that are configured to engage with a corresponding feature 211 on the spigot 210. As shown in FIG. 2, the engagement features on the legs 150a, 150b are in the form of ridges 157a, 157b configured to engage with a peripheral groove 211 around an outer edge of the spigot 210.

The spigot 210 shown in FIG. 2 is circular in cross-section, and therefore configured to engage with the legs 150a, 150b of the valve regardless of the relative rotational orientation between the valve 100 and the spigot 210. The spigot may alternatively have a non-circular cross-section having a longer and a shorter axis, to allow the spigot to be inserted prior to engagement with the valve legs 150a, 150b through relative rotation. For example, the spigot may have an oval cross-section, allowing it to be inserted with a shorter axis of the cross-section between the legs 150a, 150b of the valve. The valve 100 can then be opened through rotation of the spigot relative to the valve 100 by a quarter turn. Other cross-sectional shapes may also be possible to achieve the same effect.

Sealing surfaces 120, 130 on the valve are shown in FIG. 3 sealed against an inner surface 230 of the tube 220, thereby preventing fluid (generally liquid) from passing through the valve. Because the tube 220 is composed of a resiliently flexible, preferably elastomeric, material these seals can be maintained for as long as the valve 100 remains in place within the tube 220 before attachment to a dispensing apparatus.

FIG. 3 shows a preferred embodiment of the valve 100, in which a pair of legs is provided. A valve according to the invention may function with only one leg, or may alternatively be provided with more than two legs. For ease of manufacturing and use, however, two legs is preferred.

Figure 4:
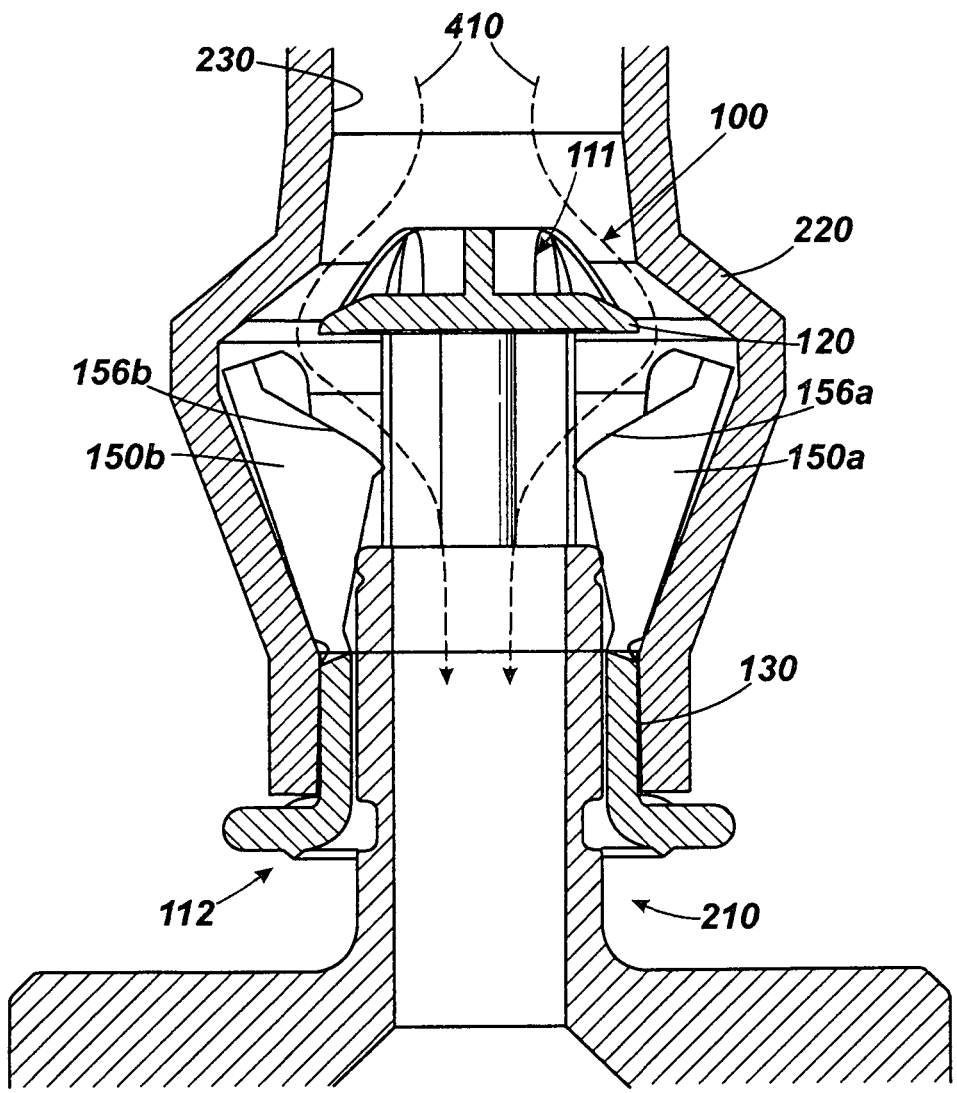
FIG. 4 is a cross-sectional view through a tube valve, tube and spigot in a second engagement configuration.

FIG. 4 illustrates a further cross-sectional view of the valve 100 when the spigot 210 has been partially inserted so as to engage with the cam surfaces 156a, 156b and thereby cause the legs 150a, 150b to flex away from the body portion 110 of the valve 100. This causes the tube 220 to locally expand and break the seal between the inner surface 230 of the tube and the sealing surface 120 at the proximal end 111 of the valve 100. Fluid can now pass along the flow paths shown by arrows 410 through the valve 100 and into the spigot 210. The seal between the sealing surface 130 at the distal end 112 of the valve is however maintained, preventing fluid from leaking out of the valve 100.

Figure 5:
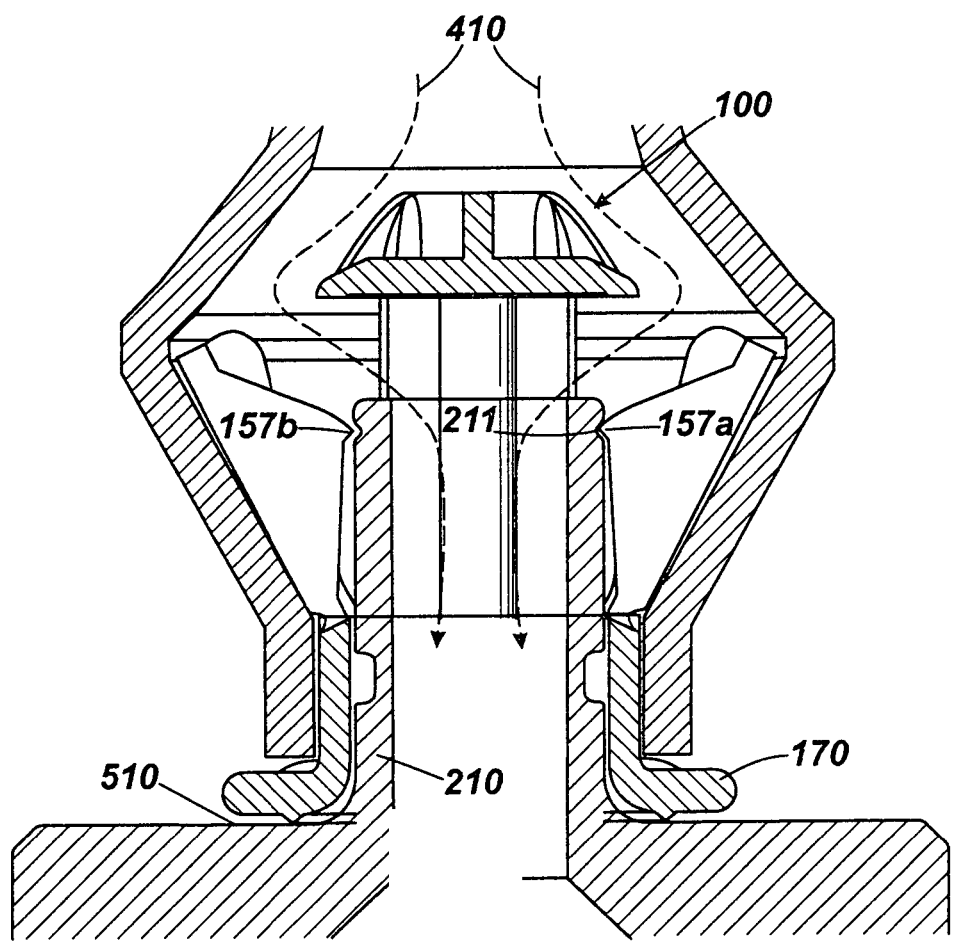
FIG. 5 is a cross-sectional view through a tube valve, tube and spigot in a third engagement configuration.

When the spigot 210 is pushed further into the valve 100, as shown in FIG. 5, the engagement features 157a, 157b on the legs engage with the corresponding feature 211 on the spigot 210. In the embodiment shown, the ridges 157a, 157b engage with a groove 211 on the spigot 210, thereby holding the valve in place on the spigot and preventing inadvertent removal of the valve 100. In this configuration, with the spigot 210 fully engaged with the valve 100, the flange portion 170 of the valve 100 is preferably engaged with a corresponding surface 510 of the dispensing apparatus, which acts as a positive end stop to allow a user to see that the valve is fully engaged.

Removal of the valve 100 from the spigot 210 is the reverse of engagement illustrated above. By gripping the tube around the distal end 112 of the valve 110, the valve can be removed from the spigot, causing the legs 150a, 150b to move back into the body portion of the valve under the resilient force of the tube 220. The sealing surface 120 is then re-engaged with the inner surface 230 of the tube 220 and a seal is made preventing fluid from escaping through the valve.

Figure 6:
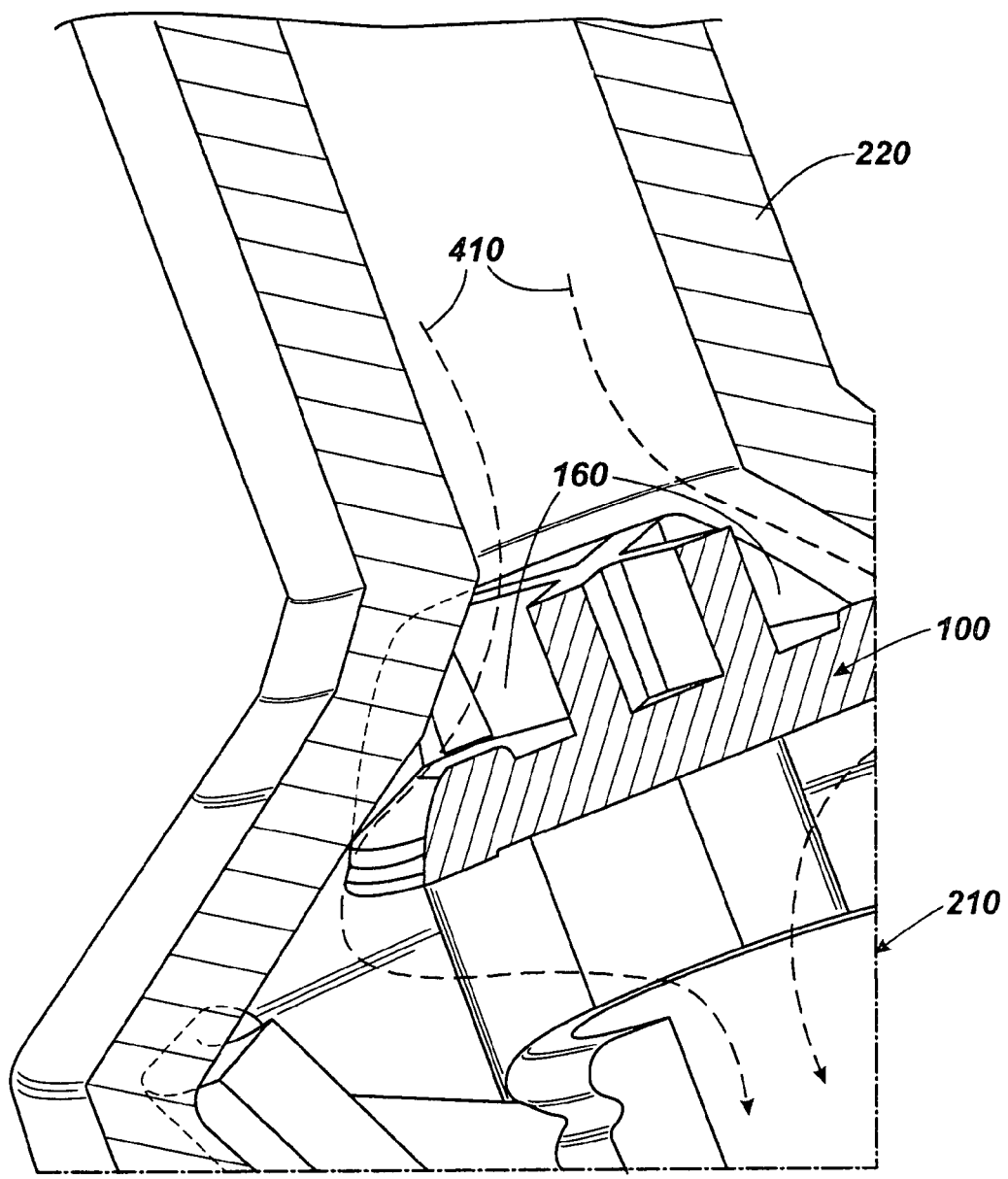
FIG. 6 is a cut-away perspective view of the tube valve, tube and spigot in the third engagement configuration.

FIG. 6 shows a further view of the valve 100 in the fully engaged configuration shown in FIG. 5. The flow paths 410 of FIGS. 4 and 5 are shown passing through cutaway portions 160 provided at the proximal end 111 of the valve 100, which serve to allow liquid to more easily pass between the tube 220 and through the valve 100 to the spigot 210.

Because the valve 100 is opened and closed as a result of a combination of the elastically resilient nature of the tube material with one or more flexible legs, a valve according to the invention can be made from a single unitary construction, for example by injection moulding. This greatly simplifies construction, thereby reducing the cost and complexity of the valve while retaining the advantages of an automatically opening and resealing valve. This has particular application in the use of such valves for liquid dispensers, for example in the catering trade, disposable valves attached to liquid containers are typically used.

The valve according to the invention is preferably made of a polymeric material, such as polypropylene or a polyacetyl, either of which can be made suitable for food grade use as well as being sufficiently flexible for being made into hinges for the legs of the valve.

A valve according to the invention may alternatively be used as an outlet valve on a liquid container, with the proximal end of the valve extending into a liquid volume within the container and the distal end serving as an outlet into which a spigot attached to a dispensing apparatus may be inserted. For this alternative embodiment, a short section of elastomeric tube, open at both ends, can be provided to seal the valve prior to insertion of the spigot.

Cam profiles of the flexible legs can be made different to those illustrated, depending on the desired flow rate through the valve. For example, a lower profile cam will allow for a reduced flow through the valve, while a higher profile cam will cause the tube wall to expand further and allow more fluid to flow through the valve.

A valve according to the invention is envisaged to be of particular use in the catering and food industry, for use in providing an automatically resealable dispensing valve for liquid containers. The valve may, however, also be of use in other applications where automatic liquid or gas valves may be required, such as in industrial chemical or gas applications. In such applications, the valve may alternatively be used as a vent rather than for dispensing.

The spigot may form part of a dispensing assembly incorporating the valve, i.e. the spigot being supplied with the valve attached to a liquid container. The spigot may alternatively be part of an apparatus for the valve to be attached to. One possible alternative would be to supply the valve 100 with a spigot in the form of a plunger, thereby forming an actuatable valve assembly. The two parts of the valve assembly may then be pushed together and/or rotated (depending on the cross-sectional shape of the spigot) to actuate the valve.

Other embodiments are intentionally within the scope of the invention as defined by the appended claims.

The invention claimed is:

1. A valve comprising a tubular body closed at a proximal end and open at a distal end, outer sealing surfaces provided at the proximal and distal ends for sealing against an inner surface of a tube, the body comprising a flexibly mounted leg between the proximal and distal ends, the leg configured to flex outwards from the body on engagement of the open distal end with a spigot so as to open a fluid flow path through the body.

2. The valve of claim 1 wherein the leg comprises an inner cam surface configured to engage with an outer surface of the spigot to cause the leg to flex outwards.

3. The valve of claim 1 wherein the leg is connected to the body section by a flexible hinge.

4. The valve of claim 1 wherein the body section is substantially cylindrical between the proximal and distal sealing surfaces.

5. The valve of claim 1 comprising a pair of said legs configured to extend outwards away from the outer surface in opposing directions on engagement of the body section around a spigot.

6. The valve of claim 4 comprising a flange extending from the distal end of the cylindrical body section.

7. The valve of claim 1 wherein the proximal end comprises a tapered section.

8. The valve of claim 1 wherein the proximal end comprises a cutaway portion defining a flow channel around the proximal end.

9. The valve of 1 wherein the valve is of a unitary construction.

10. A liquid dispensing apparatus comprising:
a container for holding liquid therein;
a dispenser tube extending from the container; and
a valve comprising a tubular body closed at a proximal end and open at a distal end and disposed within a free end of the tube, outer sealing surfaces at the proximal and distal ends of the valve being sealed against an inner surface of the tube, the body comprising a flexibly mounted leg between the proximal and distal ends, the leg configured to flex outwards from the body on engagement of the open distal end with a spigot so as to open a fluid flow path through the body.

11. A valve assembly comprising:
a valve comprising a tubular body closed at a proximal end and open at a distal end, outer sealing surfaces provided at the proximal and distal ends for sealing against an inner surface of a tube, the body comprising a flexibly mounted leg between the proximal and distal ends, the leg configured to flex outwards from the body on engagement of the open distal end with a spigot so as to open a fluid flow path through the body, and
a spigot having an outer surface configured to engage with the flexibly mounted leg to open a fluid flow path through the body of the valve.

12. The valve assembly of claim 11 wherein the outer surface of the spigot is substantially circular in cross-section.

13. The valve assembly of. claim 11 wherein the outer surface of the spigot has a cross-section with a longer and a shorter axis, the longer axis being configured to engage with the leg of the valve upon relative rotation of the valve and spigot.

14. A method of operating a liquid dispensing comprising:
providing a valve having a tubular body closed at a proximal end and open at a distal end, outer sealing surfaces provided at the proximal and distal ends for sealing against an inner surface of a tube, the body comprising a flexibly mounted leg between the proximal and distal ends, the leg configured to flex outwards from the body on engagement of the open distal end with a spigot so as to open a fluid flow path through the body, and
inserting a spigot into the open distal end of the valve to cause the flexibly mounted leg to flex outwards away from the outer surface of the tube valve, breaking a seal at the proximal end of the valve between the sealing surfaces and the inner surface of the tube and thereby opening a flow path in the valve to allow liquid to pass through the tube and the spigot.

15. The method of claim 14 wherein the flexibly mounted leg is caused to flex outwards upon relative rotation of the spigot and valve after insertion of the spigot.

* * * * *